US012331572B2

(12) United States Patent
Purcell

(10) Patent No.: US 12,331,572 B2
(45) Date of Patent: Jun. 17, 2025

(54) DUAL-ACTION DOOR HANDLE

(71) Applicant: Arctic Cat Inc., Thief River Falls, MN (US)

(72) Inventor: Lucas Grant Purcell, Grand Forks, ND (US)

(73) Assignee: Arctic Cat Inc., Thief River Falls, MN (US)

( * ) Notice: Subject to any disclaimer, the term of this patent is extended or adjusted under 35 U.S.C. 154(b) by 346 days.

(21) Appl. No.: 17/735,861

(22) Filed: May 3, 2022

(65) Prior Publication Data

US 2023/0358084 A1 Nov. 9, 2023

(51) Int. Cl.
*E05D 3/12* (2006.01)
*E05B 85/10* (2014.01)

(52) U.S. Cl.
CPC .............. *E05D 3/127* (2013.01); *E05B 85/10* (2013.01)

(58) Field of Classification Search
CPC . E05B 85/10; E05B 85/14; E05B 7/00; Y10T 292/57; E05D 3/127
See application file for complete search history.

(56) References Cited

U.S. PATENT DOCUMENTS 1,326,450 A * 12/1919 Howard et al. ....... E05B 1/0015 292/336.3
3,249,379 A * 5/1966 Ross ......................... E05C 1/14 292/336.3
3,266,275 A * 8/1966 Atkinson ............ E05B 65/5269 292/DIG. 31
3,655,230 A * 4/1972 Armstrong ................ E05C 1/14 292/DIG. 31
3,785,686 A * 1/1974 Armstrong ................ E05C 1/14 292/336.3
4,569,547 A 2/1986 Fayerman et al.
4,986,583 A * 1/1991 Campbell ............. E05B 65/104 292/336.3
5,056,838 A * 10/1991 Tiesler .................... E05B 81/10 292/201
6,196,599 B1 * 3/2001 D'Hooge .................. E05C 1/14 292/336.3
6,561,557 B2 * 5/2003 Choi ....................... E05B 83/40 292/216
6,986,534 B2 1/2006 Fisher
7,258,374 B2 * 8/2007 Rusiana .................... E05C 1/14 292/336.3

(Continued)

*Primary Examiner* — Kristina R Fulton
*Assistant Examiner* — Faria F Ahmad
(74) *Attorney, Agent, or Firm* — Lowe Graham Jones PLLC

(57) ABSTRACT

A door handle on a vehicle door includes a first grip and a second grip configured to engage fingers of a user and a web extending between the first grip and the second grip. One grip is accessible from the interior of the vehicle and the second is accessible from the exterior of the vehicle. A structure on the door handle is coupled to a latch, such as by one or more links, for releasing the latch from a striker responsive to rotation of the door handle. The one or more links may include a link having one slot receiving the structure and another slot coupled to the latch. The door handle may be positioned between mounting flanges and secured by a pin passing through the patch and an opening defined by the door handle.

20 Claims, 10 Drawing Sheets

(56) References Cited

U.S. PATENT DOCUMENTS

| | | | | |
|---|---|---|---|---|
| 7,341,291 | B2 * | 3/2008 | Ooe | E05B 77/06<br>292/336.3 |
| 7,552,954 | B2 * | 6/2009 | Rozo | E05B 41/00<br>292/DIG. 31 |
| 7,568,740 | B2 | 8/2009 | Brose et al. | |
| 10,655,370 | B2 * | 5/2020 | Richards | E05B 81/76 |
| 10,655,371 | B2 * | 5/2020 | Soonthornwinate | E05B 79/06 |
| 10,738,513 | B2 * | 8/2020 | Soonthornwinate | E05B 79/06 |
| 2007/0200367 | A1 * | 8/2007 | Peter | E05B 85/14<br>292/336.3 |
| 2010/0083715 | A1 * | 4/2010 | Peter | E05B 47/0688<br>70/141 |
| 2013/0076046 | A1 * | 3/2013 | Shah | E05B 1/0053<br>292/336.3 |
| 2015/0159399 | A1 * | 6/2015 | Shah | E05C 1/14<br>292/336.3 |
| 2015/0211253 | A1 * | 7/2015 | Shah | E05B 45/06<br>292/336.3 |
| 2018/0080267 | A1 * | 3/2018 | Park | E05C 17/60 |
| 2020/0048938 | A1 | 2/2020 | Laroche et al. | |

* cited by examiner

DUAL-ACTION DOOR HANDLE

FIELD

This application relates to handles for door latches of vehicles, particularly off-road vehicles.

BACKGROUND

Vehicles known as a four-wheelers, side-by-sides, Utility Terrain Vehicles (UTVs) or all-terrain vehicles (ATVs) have evolved considerably. Now, side-by-side sport and utility vehicles provide much of the off-road capabilities of an ATV along with some of the conveniences of an automobile. A typical side-by-side has exterior coverings including a windshield and a partially enclosed cabin accessible through hinged doors partially covering side openings of the cabin. To preserve the off-road capabilities, such structures should be lightweight and robust while still providing ingress and egress functionality.

SUMMARY

In a preferred embodiment, a door handle includes a first grip and a second grip configured to engage fingers of a user. The door handle further includes a web extending between the first grip and the second grip such that a portion of the first grip protrudes outwardly from a first side of the web and a portion of the second grip protrudes outwardly from a second side of the web, the first side of the web being opposite the second side of the web. A pivot is defined on the web and defines an axis of rotation, the pivot being configured to rotatably mount the web to a door of a vehicle.

In some embodiments, a structure is secured to any of the web, first grip, and second grip, the structure configured to engage a latch secured to the door of the vehicle. For example, the structure may be secured to the first grip. The structure may be a pin extending outwardly from the first grip. The pin may have a cylindrical portion having an axis of symmetry parallel to the axis of rotation.

The pivot may include a cylindrical opening defined on the web. The first grip and the second grip extend outwardly from the web parallel to the axis of rotation. The first grip and the second grip may have curved surfaces extending outwardly from the web perpendicular to the axis of rotation.

The door handle may be used with a latch. The latch may be coupled to the door handle such that the latch may be transitioned from a closed configuration to an open configuration responsive to rotation of the door handle about the axis of rotation. One or more rotatable links may couple the door handle to the latch. The door handle may include a first pin secured to one of the first grip, the second grip, and the web, the first pin engaging the one or more rotatable links. The one or more rotatable links may include a first link having a first end defining a first slot and a second end defining a second slot, the first pin being positioned in the first slot and a second pin positioned in the second slot, the second pin being coupled to the latch.

In some embodiments, the door handle is used with a mounting flange, the pivot and the first link being pivotably mounted to the mounting flange. The pivot may be mounted on a first side of the mounting flange and the first link may be mounted on a second side of the mounting flange opposite the first side of the mounting flange. The mounting flange may be a first mounting flange. A second mounting flange may be used with the web of the door handle extending between the first mounting flange and the second mounting flange. A third pin may pass through all of the latch, the first mounting flange, the pivot, and the second mounting flange.

The door handle may be used with a vehicle including a door having a first panel defining an opening. The pivot may be positioned on a first side of the first panel facing an interior of the vehicle and the first grip may be accessible from an exterior of the vehicle through the opening. The vehicle may include a second panel, the pivot being positioned between the first panel and the second panel. A latch may be secured to the door and a striker may be secured to a door frame of the vehicle. The door handle may be coupled to the latch such that rotation of the door handle releases the latch from the striker.

BRIEF DESCRIPTION OF THE DRAWINGS

Preferred and alternative examples of the present disclosure are described in detail below with reference to the following drawings.

DETAILED DESCRIPTION

Figure 1A:
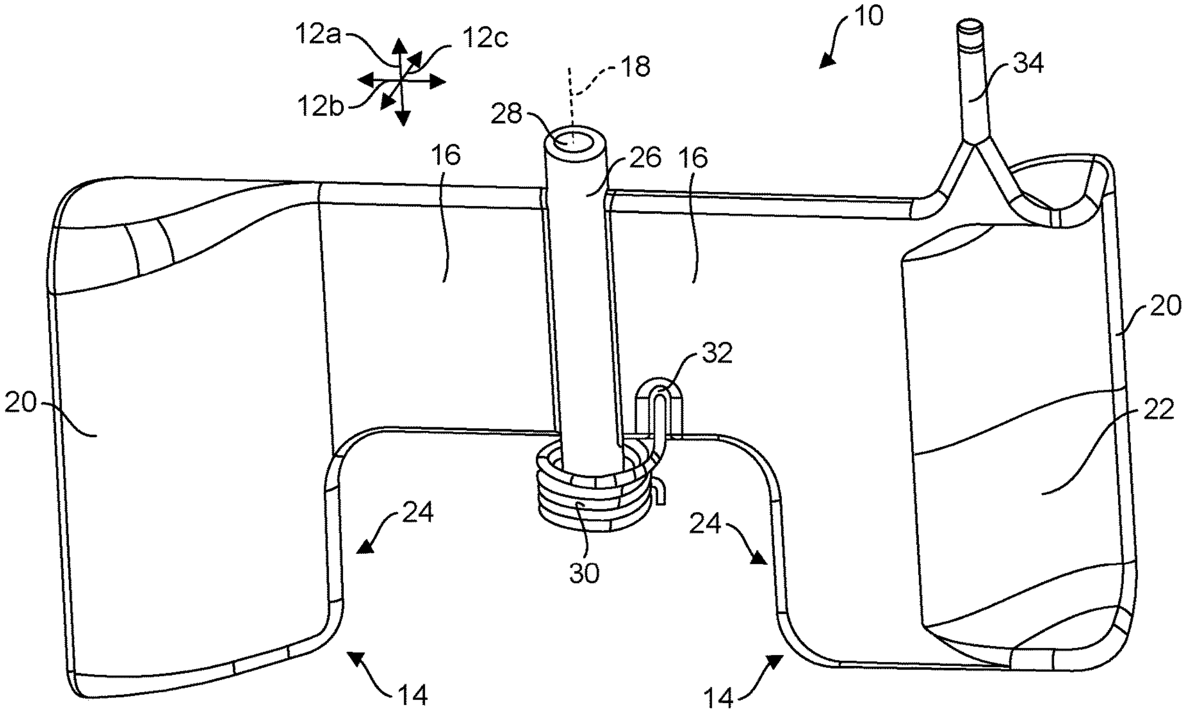
FIG. 1A is an isometric view of a dual-action door handle in accordance with an embodiment.
Figure 1B:
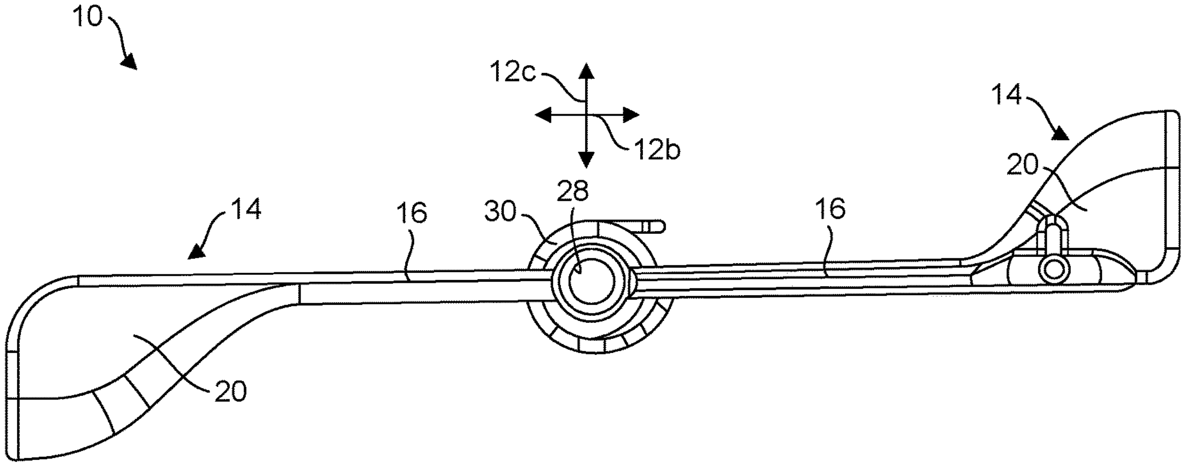
FIG. 1B is a top view of the dual-action door handle of FIG. 1A.

Referring to FIGS. 1A and 1B, a dual-action door handle 10 may be understood with respect to a vertical direction 12*a*, longitudinal direction 12*b*, and a transverse direction 12*c* that are all mutually perpendicular to one another. The directions 12*a*, 12*b*, 12*c* are used herein to describe the relative orientation and position of parts and do not necessarily correspond to actual vertical, longitudinal, and transverse directions of a vehicle in which the dual-action door handle 10 is used.

The dual-action door handle 10 may include two grips 14 offset from one another along the longitudinal direction 12*b*. In the illustrated embodiment, the grips 14 are connected to one another by webs 16 or a single web 16. In the illustrated embodiment, the webs 16 may be planar with the exceptions of rounding of corners and fillets at points of attachment to the grips 14. In the illustrated embodiment, each web 16 is larger along the vertical direction 12*a* than along the transverse direction 12*c*. This is exemplary only and other structures, such as one or more rods, a rounded web 16, or other non-planar web 16 may alternatively be used.

The grips 14 may be embodied as curved surfaces. The grips 14 may have a pinwheel relationship with respect to an axis of rotation 18 of the dual-action door handle 10: one grip 14 may be identical (within manufacturing tolerances) to the other rotated 180 degrees about the axis of rotation 18. The vertical direction 12*a* may be defined as parallel to the axis of rotation 18.

The grips 14 have a shape adapted to be comfortably gripped and/or pulled by the fingers of a user. In the illustrated embodiment, each grip 14 includes a curved surface 20 that curves outwardly in the transverse direction 12*c* to one side of the planar surfaces of the web 16 to which the grip 14 is attached directly. In the illustrated embodiment, the curved surface 20 of each grip 14 is contoured, e.g., rounded, in a plane parallel to the vertical direction 12*a* and longitudinal direction 12*b* and in a plane parallel to the longitudinal direction 12*b* and transverse direction 12*c*. One side of the curved surface 20 defines a recess 22 that may receive a user's fingers when pulling on the grip 14. In the illustrated embodiment, at least a portion 24 of the curved surface 20 and recess 22 of each grip 14 extends below the web 16 along the vertical direction 12*a*, such as an amount between 20 and 70 percent or between 45 and 55 percent of the extent of the webs 16 in the vertical direction 12*a*. Extension of each grip 14 below the web 16 may provide the handle 10 with larger recesses 22 while limiting the size of the web 16. Although shown and described as extending below the web 16, it is to be understood that each grip 14 may extend above the web 16, below the web 16, and both above and below the web 16.

In the illustrated embodiments, the webs 16 are distinct members having proximal ends thereof connected to a pivot sleeve 26 defining an opening 28, such as a cylindrical opening, for receiving a pivot pin. Alternatively, the pivot sleeve 26 may be replaced with a solid cylinder and pins and may extend outwardly therefrom and be integrally secured thereto or monolithically formed therewith. The axis of symmetry of the pivot sleeve 26 may define the axis of rotation 18. The pivot sleeve 26 may be coextensive with the webs 16 along the vertical direction 12*a* or extend outwardly above and/or below the webs 16 along the vertical direction 12*a*.

In use, the dual-action handle 10 may be biased to a closed position from which the handle 10 is moved by a user when opening a door to which the dual-action handle 10 is secured. In the illustrated embodiment, biasing may be performed by a torsion spring 30 encircling the pivot sleeve 26 or positioned below the pivot sleeve 26 and encircling the axis of symmetry of the pivot sleeve 26. One or both of the webs 16 may define an indentation 32 extending partially into the web 16 along the transverse direction 12*c* and which receives one end of the torsion spring 30. The other end of the torsion spring 30 may engage a structure of the vehicle to which the dual-action handle 10 is secured as discussed below.

The dual-action handle 10 may be used to actuate a door latch. In the illustrated embodiment, a drive pin 34 extends upwardly along the vertical direction 12*a* from a web 16 or grip 14 of the dual-action handle 10 offset from the axis of rotation 18. In the illustrated embodiment, a distal end of the drive pin 34 is cylindrical, though other shapes may also be used. Other structures for transferring rotation of the dual-action handle 10 to a door latch may be used, such as an arm emanating from the pivot sleeve 26, a linkage, chain, or other structure connecting the dual-action handle 10 to the door latch, or other structure. In the illustrated embodiment, the pin 34 is secured to one of the grips 14 such that the grips 14 are identical within manufacturing tolerances with the exception of the pin 34 and structures defining a transition between the pin 34 and the grip 14 to which it secures. The pin 34 may be formed by co-molding with the grip 14 or may be a separate member secured with threads, welding, adhesive, or other fastening methods. The grip 14 to which the pin 34 is secured may define an opening for receiving the pin 34 in such embodiments.

Figure 1C:
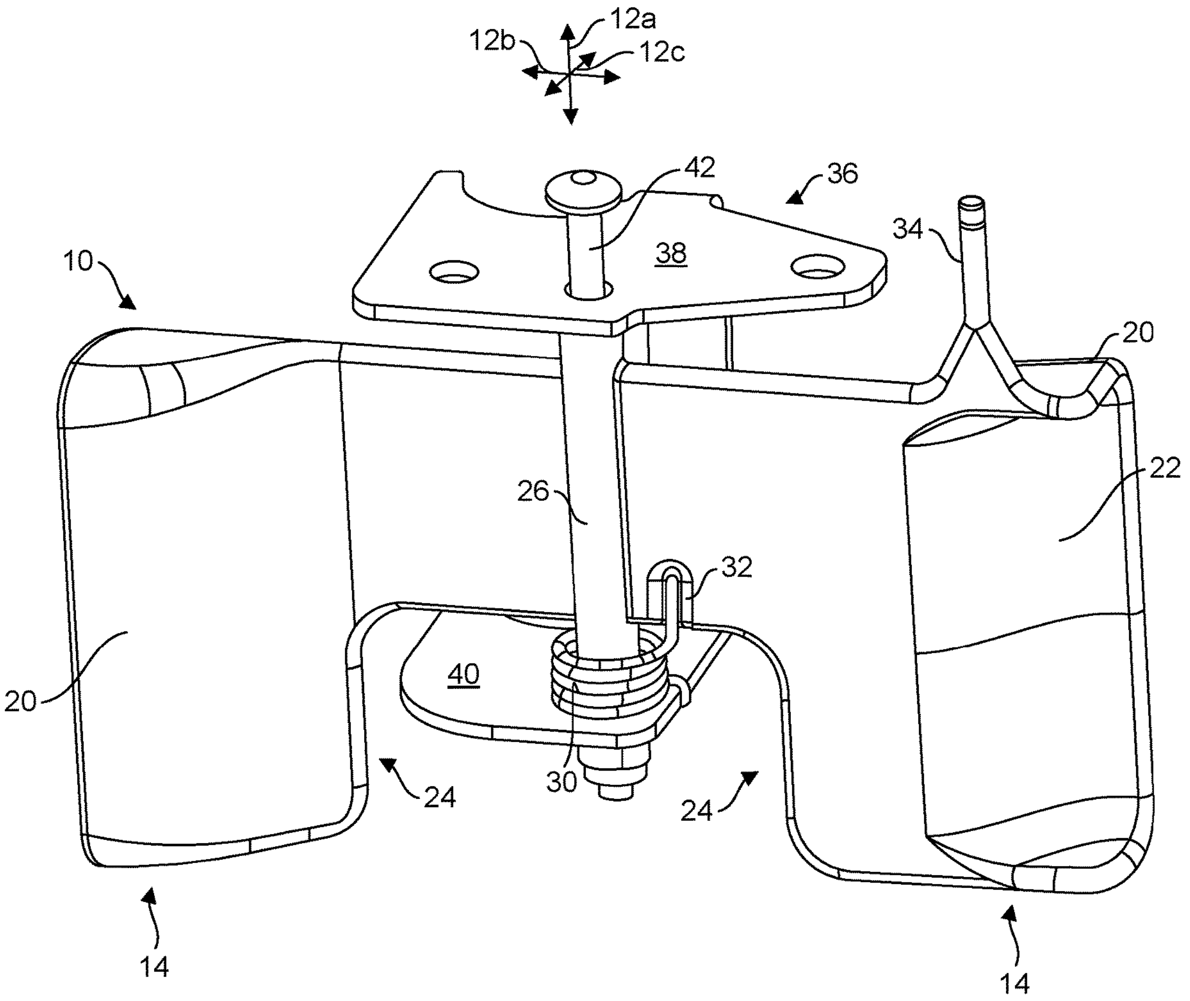
FIG. 1C is an isometric view of the dual-action door handle secured to mounting flanges in accordance with an embodiment.

Referring to FIG. 1C, the dual-action handle 10 may mount to a vehicle with a mounting bracket 36. The mounting bracket 36 may include an upper flange 38 and a lower flange 40 having the pivot sleeve 26 positioned between the upper flange 38 and lower flange 40. A pivot pin 42 may pass through the upper flange 38, pivot sleeve 26, and lower flange 40 in order to pivotally secure the dual-action handle 10 to the mounting bracket 36. In the illustrated embodiment, the drive pin 34 is positioned outward of the mounting bracket 36 and extends above the upper flange 38 in the vertical direction 12*a* when the dual-action handle 10 is secured to the mounting bracket 36 by the pivot pin 42. The pivot pin 42 may be threaded such that the pivot pin 42 may be held in place by a nut. Alternatively, welding, press fit attachment, adhesive, or other fastening methods may be used to secure the pivot pin 42 to the flanges 38, 40. The torsion spring 30 may include an end engaging a hole, notch, or simply a side surface of the lower flange 40. The torsion spring 30 may be tensioned to exert a biasing force on the dual-action handle 10 in opposition to the tension applied to the dual-action handle 10 when opening the door of the vehicle. The biasing force may be clockwise in the illustrated embodiments when viewed from above the upper flange 38 along the vertical direction 12*a*. The lower ends of the grips 14 may extend downward beyond the lower flange 40 so that the lower flange 40 is positioned therebetween when the grips 14 are not engaged and rotated.

The mounting bracket 36 itself may secure to a door of a vehicle by way of welds, bolts, screws, or other fastening methods. In some embodiments, the upper flange 38 and lower flange 40 are separate members secured separately to the door of the vehicle.

Figure 2A:
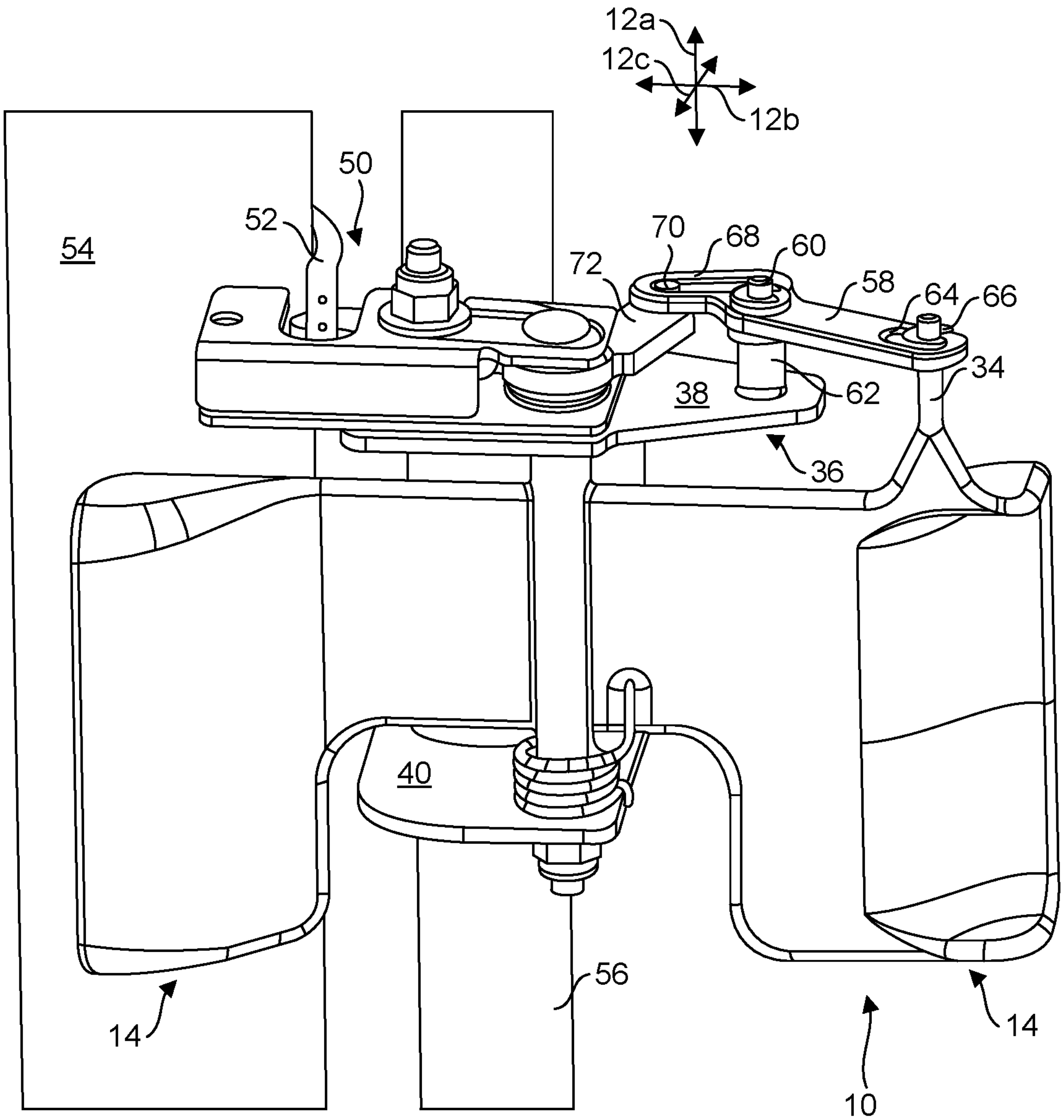
FIGS. 2A, 2B, and 2C are isometric views of the dual-action door handle in combination with a latch assembly in a closed position in accordance with an embodiment.
Figure 2B:
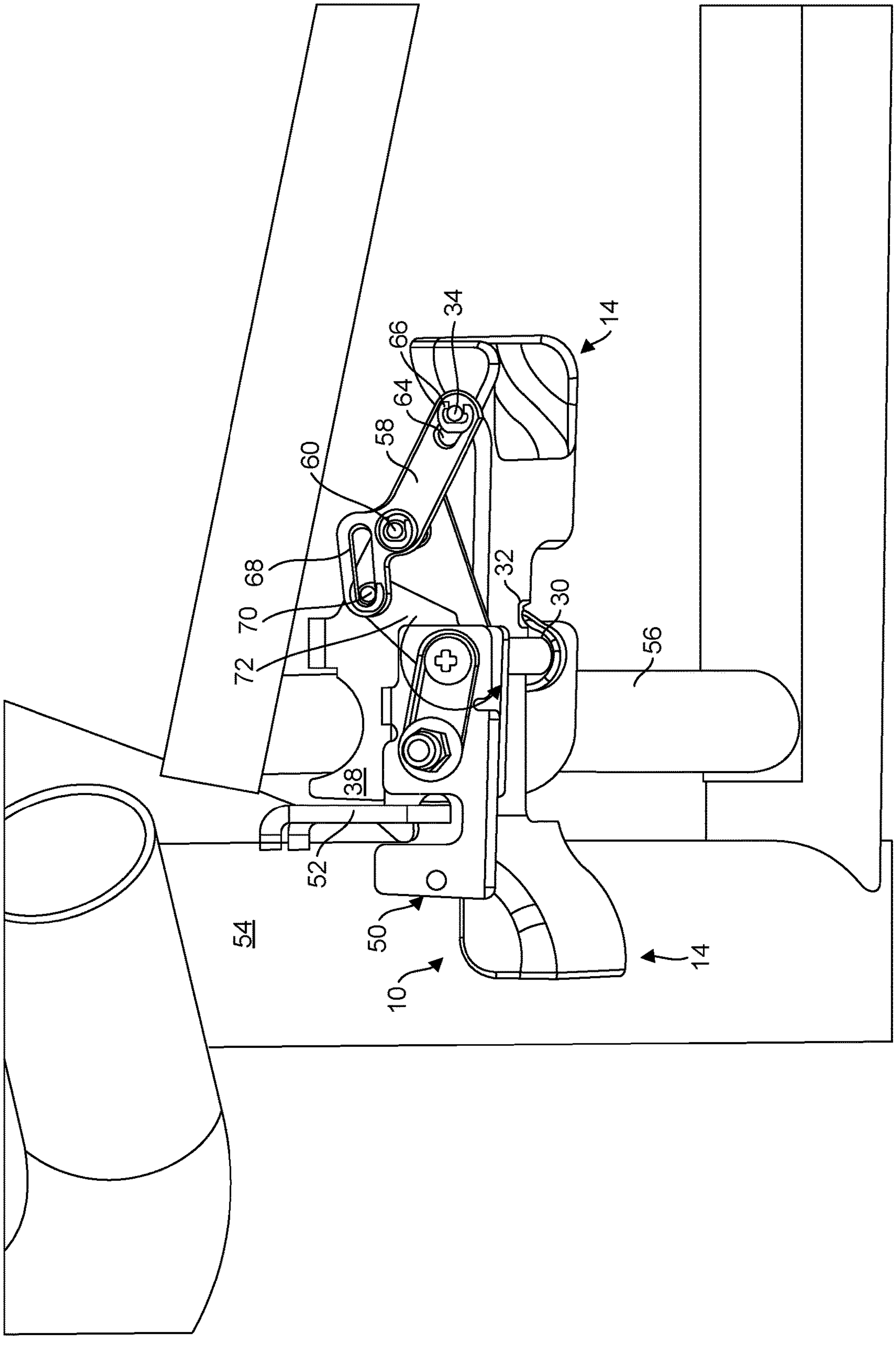
Figure 2C:
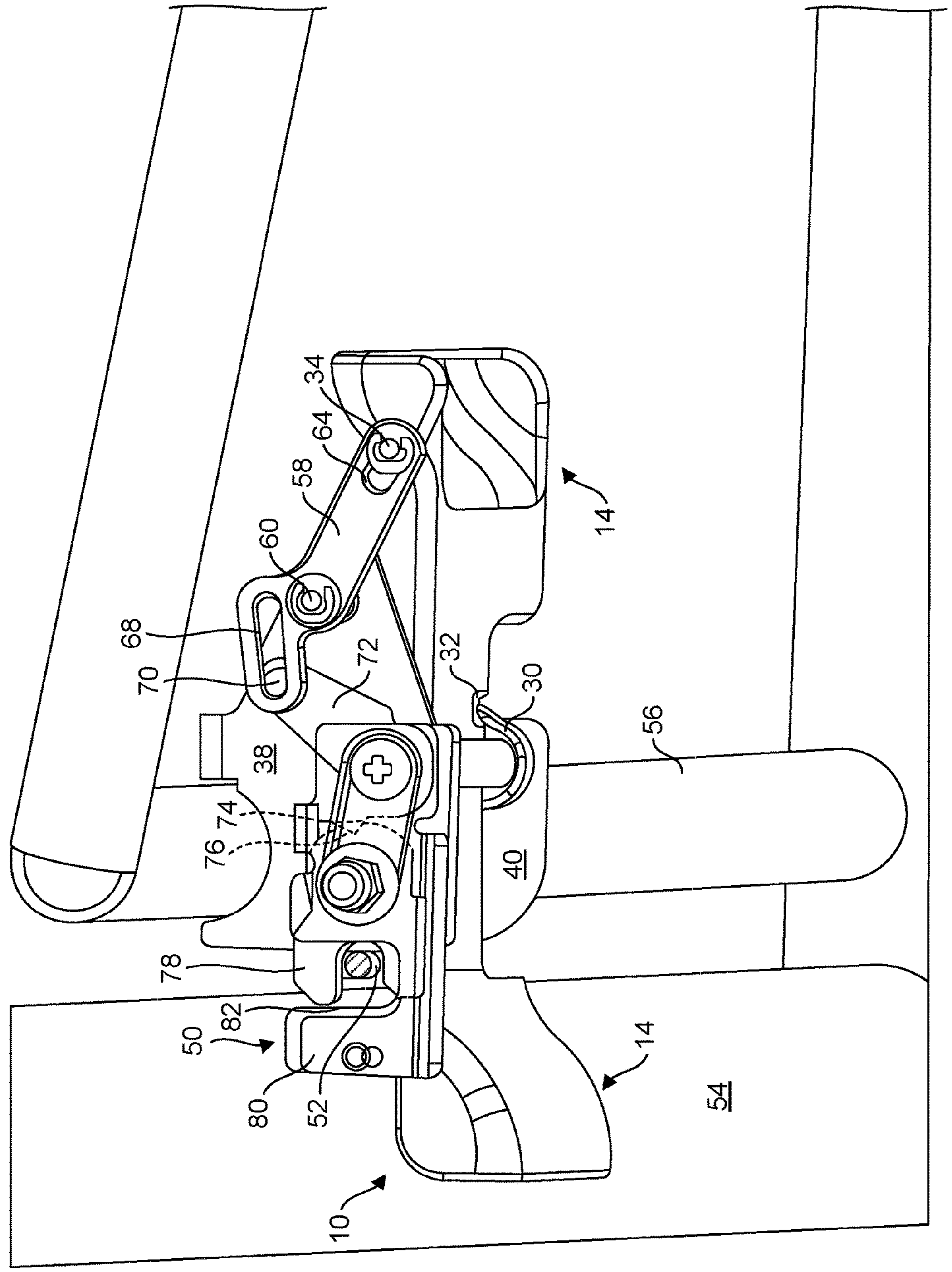

FIGS. 2A, 2B, and 2C illustrate a latch 50 for engaging a striker 52 secured to a frame member 54 of a vehicle. FIGS. 2A and 2B further show a portion of a door 56 of a vehicle having the mounting bracket 36 secured thereto. The latch 50 and striker 52 may be implemented according to any approach known in the art. In the illustrated embodiment, the latch 50 secures to the upper flange 38 but may also be secured to the lower flange 40 or to another location on the door 56 of the vehicle. In the following description, the upper flange 38 is referenced with the understanding that the lower flange 40 or other structure may be used in a like manner.

The drive pin 34 may be coupled to the latch 50 directly or by a link 58. In the illustrated embodiment, the link 58 is pivotally secured to the upper flange 38, such as by a pin 60. The link 58 may be elevated above the upper flange 38 by a spacer 62 to facilitate alignment with the latch 50. One end of the link 58 may include a slot 64 through which the drive pin 34 extends. The drive pin 34 may be retained within the slot 64 due to rigidity of the dual-action handle 14 and/or a snap ring 66, or other fastener, such that the link 58 is positioned between the snap ring 66 and the upper flange 38.

Another end of the link 58 includes a slot 68. The axis of rotation of the link 58 defined by the pin 60 may be positioned between the slot 64 and the slot 68. A pin 70 may be positioned within the slot 68 and be connected to a release lever 72 that is part of the latch 50 and is pivotable with respect to other parts of the latch 50. The slot 64 and slot 68 may be arranged to permit rotation of the dual-action handle 10 and release lever 72 notwithstanding the axes of rotation of the dual-action handle 10 and release lever 72 being offset form the axis of rotation defined by the pin 60. In the illustrated embodiment, the long dimension of the slot 64 along which the drive pin 34 slides intersects the pin 70. In contrast, the slot 68 does not intersect the pin 70. The lengths of the slots 64, 68 and their offsets relative to the axis of rotation defined by the pin 70 may be selected to achieve a desired range of motion of the dual-action handle 10 and a corresponding induced range of motion of the release lever 72 required to release the latch 50 from the striker 52.

The axes of rotation defined by the pin 42, pin 60, and pin 70 may be substantially parallel, e.g., within 5 degrees, and may also be substantially parallel to the vertical direction 12*a*.

Referring specifically to FIG. 2C, the release lever 72 may define a pawl 74 that engages a notch 76 defined on a hook 78. When in the closed position, the hook 78 captures the striker 52. For example, a housing 80 to which the release lever 72 and hook 78 are pivotably secured may define a notch 82 and the hook 78 protrudes into this notch 82 preventing the striker from being removed from the notch 82. A biasing spring (not shown) within the latch 50 biases the hook 78 toward rotation out of the notch 82. Another biasing spring (not shown) may bias the pawl 74 into the notch 76. Alternatively, the biasing spring 30 may transfer sufficient force through the door handle 10 by way of the drive pin 34 such that a separate biasing spring for the pawl 74 is not used. Engagement of the pawl 74 with the notch 76 prevents the hook 78 from rotating out of the notch 82 (clockwise as shown in FIG. 2C) resisting this biased rotation as well as forces exerted on the door 56 itself.

Figure 3A:
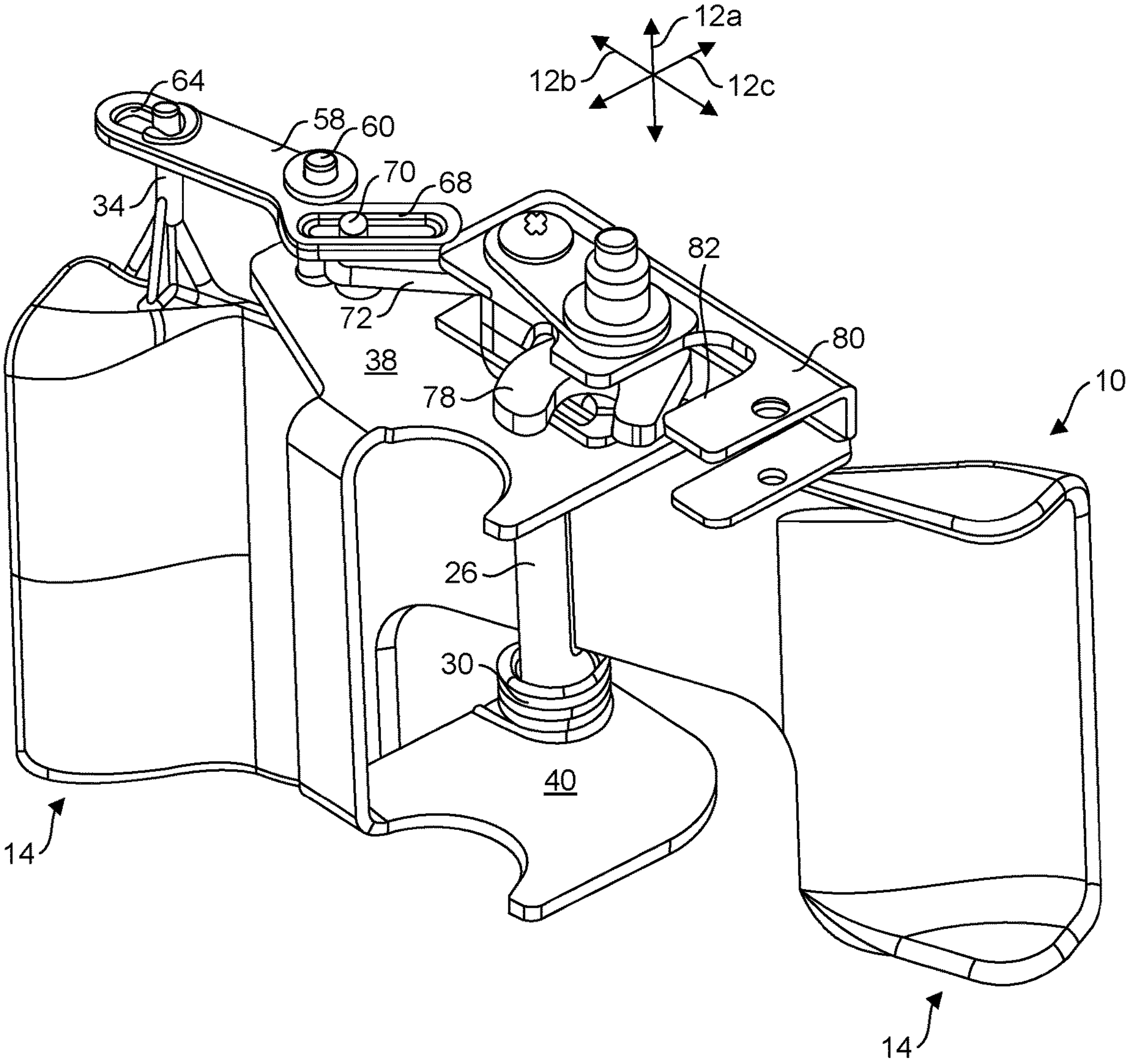
FIGS. 3A and 3B are isometric views of the dual-action door handle and latch assembly in an open position in accordance with an embodiment.
Figure 3B:
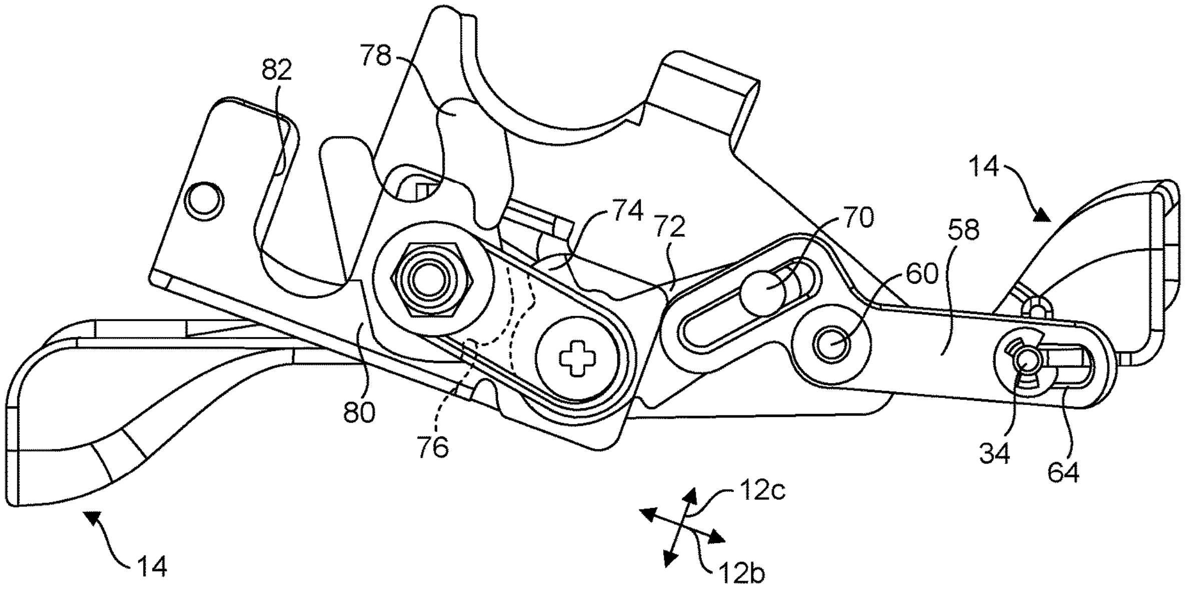

Referring to FIGS. 3A and 3B, when a user pulls on the dual-action handle 10 using either of the grippers 14, the dual-action handle 10 rotates (counterclockwise as shown in FIGS. 3A and 3B) and induces a corresponding rotation of the link 58, which rotates the release lever 72 such that the pawl 74 is rotated out of engagement with the notch 76. The hook 78 is now free to rotate out of the notch 82 due to the biasing spring and does so. The striker 52 is then free to exit the notch 82 as the door 56 is opened. Closing is the reverse of opening as the striker 52 forces the hook 78 into the notch 82 and the pawl 74 is biased into the notch 76.

Figure 4A:
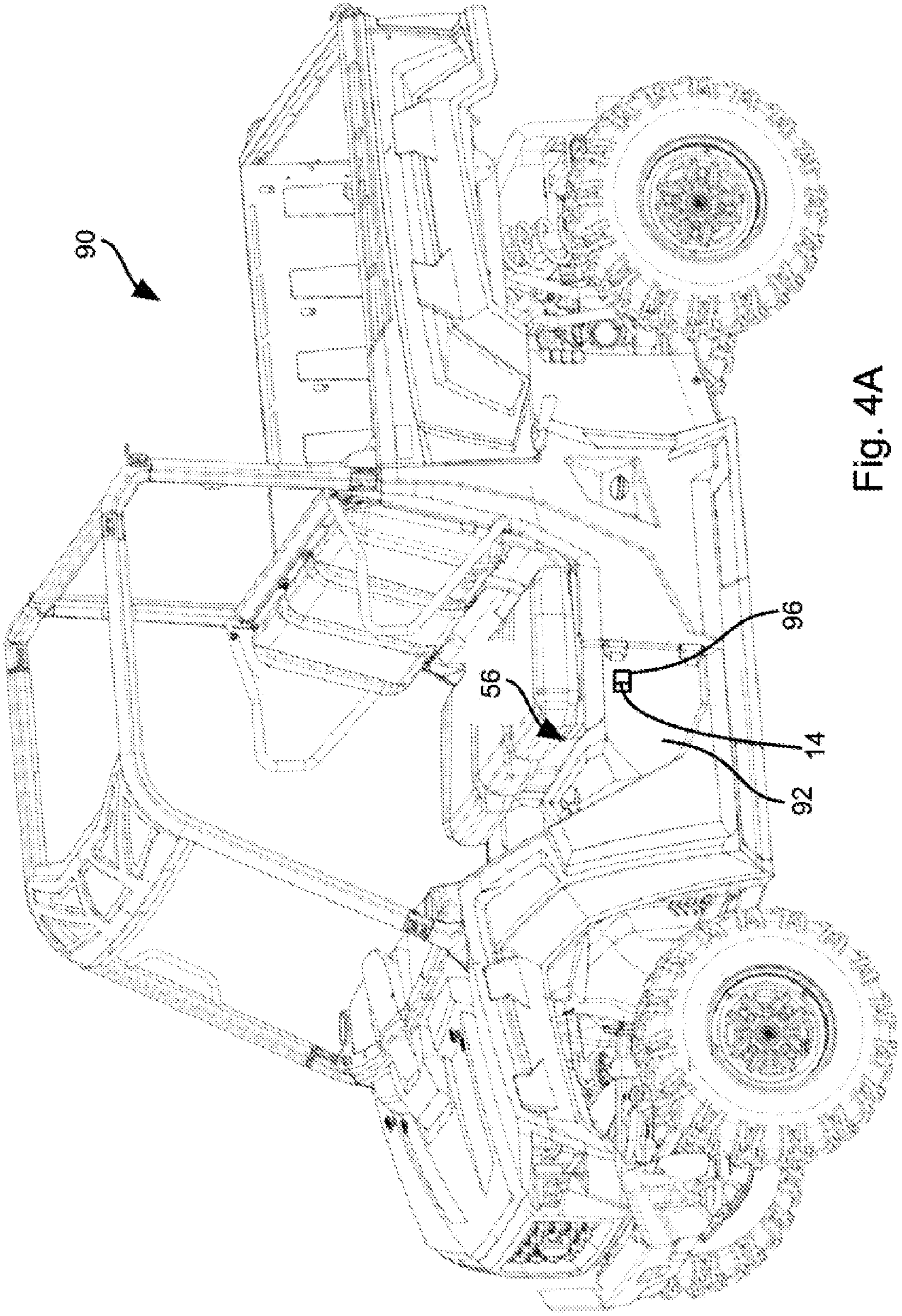
FIG. 4A is an isometric view of a vehicle incorporating the dual-action door handle in accordance with an embodiment.
Figure 4B:
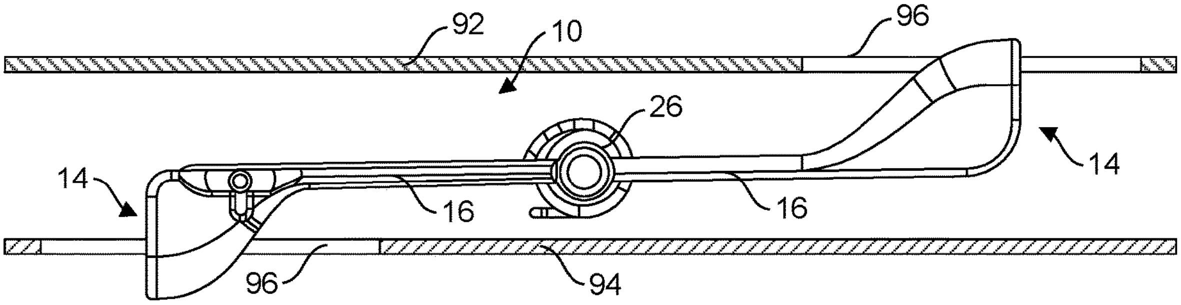
FIG. 4B is a top view of a door panel incorporating the dual-action door handle in accordance with an embodiment.

Referring to FIGS. 4A and 4B, the dual-action door handle 10 and the latch 50 may be incorporated into the door 56 of a vehicle 90. The door 56 may include an outer panel 92 facing the exterior of the vehicle and an inner panel 94 facing the interior of the vehicle. Each panel 92, 94 may include an opening 96 through which one of the grips 14 is accessible. Accordingly, the dual-action door handle 10 can be used to disengage the latch 50 by a user outside or inside the vehicle. There is therefore not a need for separate handles with corresponding mounting hardware and linkages to the latch 50.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A vehicle door having a door handle for securement to a vehicle having an interior and an exterior, the vehicle door comprising:
- a door inner panel exposed to the interior of the vehicle door;
- a door outer panel exposed to the exterior of the vehicle door;

the door handle comprising:
- a first grip and a second grip configured to engage fingers of a user, the first grip being exposed through the door inner panel and accessible from the interior of the vehicle, the second grip being exposed through the door outer panel and accessible from the exterior of the vehicle;
- a web extending between the first grip and the second grip such that a portion of the first grip protrudes outwardly from a first side of the web and a portion of the second grip protrudes outwardly from a second side of the web, the first side of the web being opposite the second side of the web; and
- a pivot defined on the web and defining an axis of rotation, the pivot configured to rotatably mount the web to a door of a vehicle,
- wherein the first grip is disposed opposite the web from the second grip, the first grip being on a first side of the pivot and the second grip being on a second side of the pivot such that the first grip and the second grip rotate about the same axis but translate in substantially opposite directions when rotated on the axis of rotation.

2. The door handle of claim 1, further comprising a structure secured to any of the web, first grip, or second grip and configured to engage a latch secured to the door of the vehicle.

3. The door handle of claim 2, wherein the structure is a pin extending outwardly from the first grip.

4. A door handle comprising:
- a first grip and a second grip configured to engage fingers of a user;
- a web extending between the first grip and the second grip such that a portion of the first grip protrudes outwardly from a first side of the web and a portion of the second grip protrudes outwardly from a second side of the web, the first side of the web being opposite the second side of the web; and
- a pivot defined on the web and defining an axis of rotation, the pivot configured to rotatably mount the web to a door of a vehicle,
- a pin extending outwardly from the first grip and configured to engage a latch secrured to the door of the vehicle,
- wherein the first grip is disposed opposite the web from the second grip, the first grip being on a first side of the pivot and the second grip being on a second side of the pivot such that the first grip and the second grip rotate about the same axis but translate in substantially opposite directions when rotated on the axis of rotation,
- wherein the pin has a cylindrical portion having an axis of symmetry parallel to the axis of rotation.

5. The door handle of claim 4, wherein the pivot comprises a cylindrical opening defined on the web.

6. The door handle of claim 4, wherein the first grip and the second grip extend outwardly from the web parallel to the axis of rotation.

7. The door handle of claim 1, wherein the first grip and the second grip have curved surfaces extending outwardly from the web perpendicular to the axis of rotation.

8. An apparatus comprising:
- a door having an inner surface and an outer surface;
- a door handle secured to the door, the door handle including:
  - a first grip and a second grip configured to engage fingers of a user;

a web extending between the first grip and the second grip such that a portion of the first grip protrudes outwardly from a first side of the web and a portion of the second grip protrudes outwardly from a second side of the web, the first side of the web being opposite the second side of the web; and a pivot defined on the web and defining an axis of rotation, the pivot configured to rotatably mount the web to a door of a vehicle, wherein the first grip is disposed opposite the web from the second grip, the first grip extending on a first side of the pivot and being exposed through the inner surface of the door and the second grip extending on a second side of the pivot and being exposed through the outer surface of the door, such that rotational movement of the first grip results in opposite translational movement of the second grip relative to a plane containing the axis of rotation; and a latch coupled to the door handle such that the latch may be transitioned from a closed configuration to an open configuration responsive to rotation of the door handle about the axis of rotation.

9. The apparatus of claim 8, further comprising one or more rotatable links coupling the door handle to the latch.

10. The apparatus of claim 9, wherein the door handle further comprises a first pin secured to one of the first grip, the second grip, and the web, the first pin engaging the one or more rotatable links.

11. An apparatus comprising:

a door handle including:

a first grip and a second grip configured to engage fingers of a user;

a web extending between the first grip and the second grip such that a portion of the first grip protrudes outwardly from a first side of the web and a portion of the second grip protrudes outwardly from a second side of the web, the first side of the web being opposite the second side of the web; and a pivot defined on the web and defining an axis of rotation, the pivot configured to rotatably mount the web to a door of a vehicle, wherein the first grip is disposed opposite the web from the second grip, the first grip extending on a first side of the pivot and the second grip extending on a second side of the pivot such that rotational movement of the first grip results in opposite translational movement of the second grip relative to a plane containing the axis of rotation; and a latch coupled to the door handle such that the latch may be transitioned from a closed configuration to an open configuration responsive to rotation of the door handle about the axis of rotation;

one or more rotatable links coupling the door handle to the latch;

wherein the door handle further comprises a first pin secured to one of the first grip, the second grip, and the web, the first pin engaging the one or more rotatable links;

wherein the one or more rotatable links include a first link having a first end defining a first slot and a second end defining a second slot, the first pin being positioned in the first slot and a second pin positioned in the second slot, the second pin being coupled to the latch.

12. The apparatus of claim 11, further comprising a mounting flange, the pivot and the first link being pivotably mounted to the mounting flange.

13. The apparatus of claim 12, wherein the pivot is mounted on a first side of the mounting flange and the first link is mounted on a second side of the mounting flange opposite the first side of the mounting flange.

14. The apparatus of claim 13, wherein the mounting flange is a first mounting flange, the apparatus further comprising a second mounting flange, the web of the door handle extending between the first mounting flange and the second mounting flange.

15. The apparatus of claim 14, further comprising a third pin passing through all of the latch, the first mounting flange, the pivot, and the second mounting flange.

16. A vehicle comprising:

a door having an inner panel defining an inner opening and an outer panel defining an outer opening; and a door handle including:

a first grip and a second grip configured to engage fingers of a user;

a web extending between the first grip and the second grip such that a portion of the first grip protrudes outwardly from a first side of the web and a portion of the second grip protrudes outwardly from a second side of the web, the first side of the web being opposite the second side of the web; and a pivot defined on the web and defining an axis of rotation, the pivot pivotally mounted to the door;

wherein the pivot is positioned on a first side of the first panel facing an interior of the vehicle and the first grip is accessible from an exterior of the vehicle through the opening, wherein the first grip is disposed opposite the web from the second grip, the first and second grips being disposed on opposite functional sides of the pivot such that the grips translate in substantially opposite directions when rotated about the pivot;

wherein the first grip is accessible through the inner opening and wherein the second grip is accessible through the outer opening.

17. The vehicle of claim 16, wherein the pivot is positioned between the inner panel and the outer panel.

18. The vehicle of claim 16, further comprising a latch secured to the door and a striker secured to a door frame of the vehicle, the door handle being coupled to the latch such that rotation of the door handle releases the latch from the striker.

19. The vehicle of claim 16, wherein the first grip and the second grip each have a curved surface extending outwardly from the web perpendicular to the axis of rotation.

20. The door handle of claim 1, wherein the first grip is disposed opposite the axis of rotation from the second grip substantially 180 degrees from the second grip.

* * * * *